United States Patent
Chandler

[15] 3,655,472
[45] Apr. 11, 1972

[54] METHOD OF MAKING HIGH BRIGHTNESS REFLECTION SCREENS

[72] Inventor: Jasper S. Chandler, Rochester, N.Y.
[73] Assignee: Eastman Kodak Company, Rochester, N.Y.
[22] Filed: Sept. 16, 1969
[21] Appl. No.: 858,328

[52] U.S. Cl...............................156/156, 156/145, 156/285, 161/407, 264/93, 264/94, 156/163
[51] Int. Cl............................................B29c 17/00
[58] Field of Search.................156/145, 146, 147, 156, 285; 161/163, 407; 264/93, 94

[56] References Cited

UNITED STATES PATENTS

| | | | |
|---|---|---|---|
| 3,170,828 | 2/1965 | Irvine | 156/285 X |
| 3,408,132 | 10/1968 | Chandler et al. | 350/125 |
| 3,442,996 | 5/1969 | Fisher et al. | 264/93 X |
| 3,481,087 | 12/1969 | Stafford | 52/2 |
| 3,161,553 | 12/1964 | Visser | 156/156 |

Primary Examiner—Carl D. Quarforth
Assistant Examiner—R. L. Tate
Attorney—W. H. J. Kline, Paul R. Holmes and J. W. Berkstresser

[57] ABSTRACT

High brightness reflection screens of the type described in U.S. Pat. No. 3,408,132 can be formed to the required curvature from nonself-supporting aluminum foil without the use of rigid molds by employing air pressure in the manner described to inflate the foil. The aluminum foil is made self-supporting with resin and resin reinforcing materials.

5 Claims, 4 Drawing Figures

PATENTED APR 11 1972  3,655,472
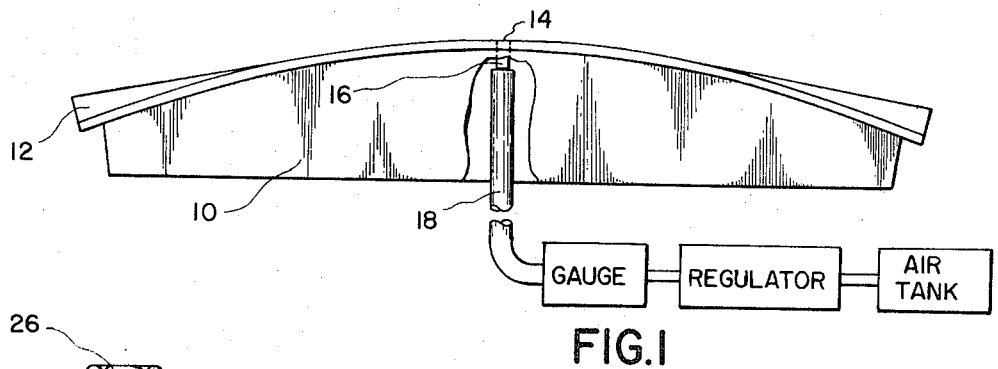
FIG.1
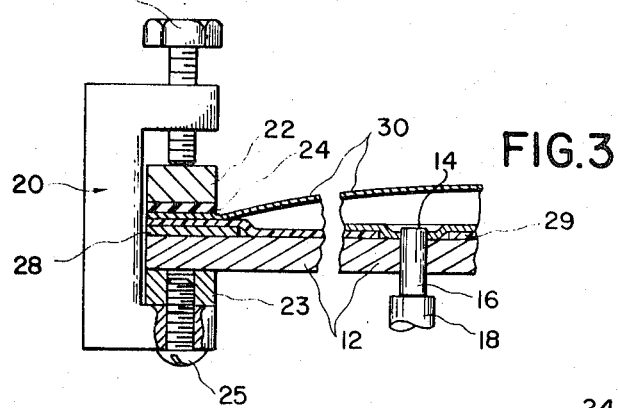
FIG.3
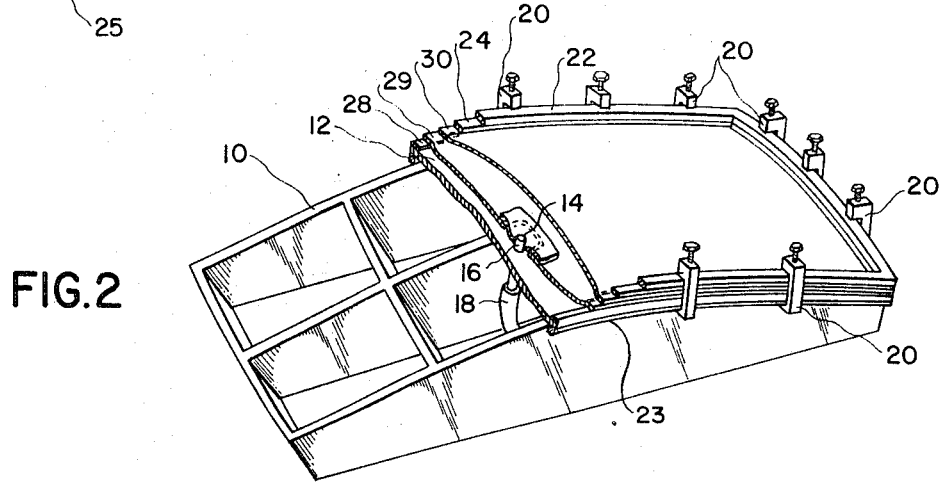
FIG.2
FIG.4
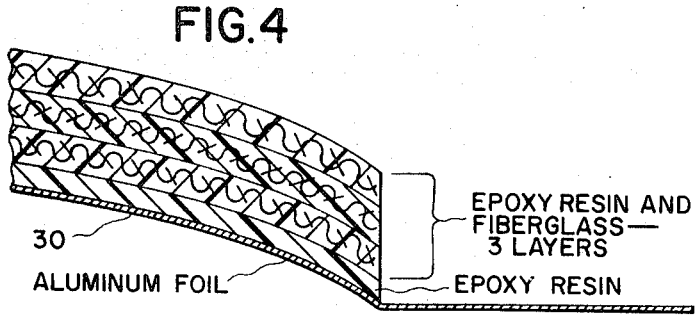
JASPER S. CHANDLER
INVENTOR.
BY J W Berkstresser
ATTORNEYS

METHOD OF MAKING HIGH BRIGHTNESS REFLECTION SCREENS

This invention relates to a method of making high brightness reflection screens from nonself-supporting metal foils.

The advantages inherent in the aluminum foil screens disclosed in U.S. Pat. No. 3,408,132 are fully described therein. The present methods being practiced for the production of these screens, have not proceeded without some difficulties. The forming technique generally employed utilizes a rigid male mold to which the aluminum foil or similar surfaced high reflectance materials is pressed by vacuum or the use of a female mold. While the use of expensive molds is generally satisfactory they require an unusually high degree of handling care. For example, the mold must be very carefully made and be free of any dirt particles or other imperfections. The matte surface of the aluminum foil is the surface which delivers the high brightness characteristics. This surface is easily marred with consequent damage to the optical properties. If the matte surface of any of the useful materials is damaged in even the slightest manner there is generally damage to the optical reflectance properties. It is also nearly impossible to restore the high reflectance characteristics to aluminum foil once it has been creased or otherwise distorted in the mold by the action of dirt and the like. It is also necessary in these processes to use annealed foil instead of so-called "full hard" foil. Annealing foil increases its cost and increases the opportunity for damage to the foil due to greater handling.

Further, it is desirable that the molding technique for the aluminum foil includes a means for rendering the foil selfsupporting. Without this feature the foil is still subject to damage of its optical properties when handled after forming.

It is therefore an object of this invention to provide a high brightness screen with a metal foil whose surface displays the requisite optical reflection characteristics and is substantially free of physical defects received from molding operations.

It is a further object of this invention to provide a method for making a self-supporting aluminum surfaced high brightness screen without contacting the reflectance surface with rigid molding apparatus during formation.

These and other objects of the invention will become more fully apparent hereinafter and by reference to the accompanying drawing wherein:

FIG. 1 is a side view of a rectangular clamping form.

FIG. 2 is a partially broken perspective view of the clamping form of FIG. 1 with the metal foil in place.

FIG. 3 is a partially sectioned fragmentary view of the clamp attachment preferably used with the clamping forms shown in FIGS. 1 and 2.

FIG. 4 is a fragmentary perspective view in section of the self-supporting screen made by the method of the present invention.

Referring now more particularly to the drawings, in FIG. 1 rectangular wooden frame 10 has fastened thereon a frame top 12 made of fiber board, plywood, or other flexible self-supporting material. Frame top 12 is adapted to overlap the edges of frame 10 sufficiently to permit the use of the clamps shown in FIG. 2 around the perimeter of frame top 12 without interferring with the sides or end portions of frame 10. The inside edges of the clamps on frame top 12 approximately defines an intersection with the surface of a sphere. In addition frame top 12 contains an opening 14 through which a hose coupling 16 communicates and which in turn has attached thereto a hose 18 which is connected to an air tank or other convenient even supply of gas through a gauge and regulator shown schematically and legended.

During preparation of the high brightness reflection screen according to the method of the present invention the clamps 20 in FIG. 2 are used in combination with aluminum strips 22 and 23. Aluminum strip 22 contains attached on the work engaging face thereof a neoprene, a polyurethane or other elastomeric strip 24, Clamp 20 is C-shaped and is provided at the lower arm of the "C" with a hole through which bolt 25 communicates and is threaded into aluminum strip 23. The top arm of the C-clamp 20 contains a threaded hole which receives a threaded bolt 26 which bears on aluminum strip 22 providing pressure thereon depending upon the adjustment of bolt 26. Emery cloth 28 is positioned on top of board 12 along the edge thereof and adjacent polyolefin sheeting 29. Aluminum foil 30 is received between the neoprene strip 24 and polyolefin sheeting 29. In operation the clamp 20 is used to apply sufficient pressure to aluminum foil 30 through aluminum strips 22 and 23 and neoprene strip 24 to prevent polyolefin sheet 29 and aluminum foil 30 from slipping under application of air pressure. Helping in this regard is emery cloth 28 which provides sufficient tooth to both the polyolefin sheeting 29 and the aluminum foil 30 for deformable neoprene strip 24 to hold the aluminum foil. The tightness of the clamp is adjustable by turning bolt 26. Bolt 25 and aluminum strip 23 do not adjust but provide a base member against which the adjustment of bolt 26 can be effective.

In operation the hose coupling 16 communicates through the hole 14 in frame top 12 (FIG. 1). The polyolefin sheeting 29 is fastened to the coupling in an air-tight manner and the space between polyolefin sheeting 29 and aluminum foil 30 communicates with a source of gas pressure via hose coupling 16, hose 18, gauge, regulator, and air tank. Emery cloth 28 is positioned around a periphery of board 12 and preferably adhesively affixed thereto. Aluminum foil 30 is placed with the screen surface down, facing the top of the polyolefin sheeting. A plurality of the clamps 20, provided with aluminum strips 22 and 23 are placed around the periphery of frame top 12 as shown in FIG. 2 to engage and hold the sheeting 29 and foil 30. When air pressure is applied to the space defined by polyolefin sheeting 29 and aluminum foil 30 the limp aluminum foil is gently urged into the figuration shown in FIG. 2. The shape achieved closely conforms to the outer surface of a sphere whose boundary is defined by the edge of frame top 12 on frame 10.

When the aluminum foil has been given the proper shape, by the application of fluid pressure as shown in FIG. 2, a layer of resin such as epoxy resin may be squeegeed onto the taut, shiny surface of the aluminum foil. Subsequent applications of reinforcing or filler materials such as woven or matte glass fibers and additional resin will provide a rigid self-supporting article that can be removed from the wooden frame 10 after releasing the clamps 20. The now self-supporting screen can be trimmed to any desired size and mounted for optimum optical use.

It is important to an understanding of the present invention to appreciate that this method is not intended to substantially work the foil or reflective surface. Distortion of the materials used by stretching, substantial working and the like, characterizes prior art fluid forming processes. Where high reflectance surfaces are used, significant dimensional changes would produce a non-uniform reflecting surface. The method of the present invention provides a convenient means of forming self-supporting materials in the proper configuration for use as high reflectance screens from nonself-supporting materials without distortion.

The following is a description of the preparation of aluminum surfaced self-supporting high reflectance screen according to the method of this invention from aluminum foil having the requisite surface reflectance.

A frame 10 and frame top 12 are constructed from suitable materials such as wood, metal, plastics and the like so that the line where the metal foil is clamped, defines an intersection with the surface of a sphere whose radius is equal to that of the desired screen shape. To achieve this required geometric shape the edges of the frame top 12 are defined by the right angle intersection of two cylinders each having a radius equal to the square root of the difference between the square of the desired spherical radius and the square of the quantity S/2 where S is the short dimension of the rectangle. Within this relationship any rectangular or square screen can be fabricated as described herein to provide the requisite reflective properties. Of course circular shaped screens and irregular shaped screens can also be fabricated. Irregular shapes would most conveniently be cut down from previously formed square or rectangular screens. Circular forms though more difficult to construct have the advantage of flexibility, i.e., screens of different spherical radii can be made from the same form.

The design considerations most important to the construction of a frame are related to the properties of the metal foil used. For example, 0.001 inch thick full hard aluminum foil will break at about 2 percent elongation. When this foil is used the percentage elongation at the center of the foil span will be the greatest experienced over the entire foil. A radius that is 3.5 or more times the desired screen width is generally satisfactory and will normally not create elongation breakage problems.

The aluminum foil is placed, dull or matte side down over polyethylene sheeting which covers the frame top. Sheeting can contain a hole, communicating with a source of gas pressure or not depending on whether the sheeting will cover the frame top or engage the foil or both under inflation. The clamps are tightened and air or other suitable gas pumped or a body of fluid otherwise released directly or indirectly against the aluminum foil. The height of the foil and its shape can typically be gauged with a template and the delivery of air pressure measured conveniently by a suitable gauge or by a water manometer. Air or other gas delivery can be conventionally regulated for example with a home gas service type of regulator and pumped with even a small aquarium areator pump or by other conventional even sources of air pressure. With this equipment 11 to 12 inches of water pressure is sufficient to achieve the proper shape for a screen of 24 × 32 inch size using 0.001 hard foil. The pressure is then lowered after a short time to approximately 8 inches of water to maintain a stable shape. This pressure also keeps the foil sufficiently rigid for subsequent work. Other gases and gas pressure means could likewise be adapted for use herein.

Typically a conventional epoxy resin with hardener is applied to the shiny, fluid supported surface of the foil. This first application is preferably permitted to harden before application of woven glass cloth so the weave pattern does not show through the foil and adversely effect the reflecting surface. Alternatively glass fiber matte or fine woven glass cloth can be used. Preferably these materials are treated to improve their adhesion to the resins used. The glass cloth is applied (such as Style 116 Burlington Glass Fabrics Co. with Volar Finish) more resin, more cloth and more resin to build up a laminate. In place of glass cloth other reinforcing media or fillers may be used with the resin or adhesive selected. Selection of the resin or adhesive and filler or reinforcement materials which are optimum for a particular design can be a matter of individual preference. Resins, polymers, prepolymers, monomers and the like may in certain circumstances be advantageously employed. Undue experimentation is not necessary to discover which materials in the art now or which may be discovered, will be suitable. Likewise method of application for these materials can vary widely. Squeegees, rollers, sprays, brushes and the like may be used successfully. Proper tool selection and use will be governed by the fragile character of the foil and care must always be taken to prevent scratches, creases, punctures and the like which could destroy the desired optical properties. Adhesives used to build up the laminate or others may be employed to fasten the frame or the like to the screen. Subsequent trimming and finishing can be accomplished in any suitable conventional manner. For example, after suitable preparation to prevent surface irregularities from being produced by foam cells, the entire back of the screen may be covered with a dense, self-supporting plastic foam. Such a procedure may, with the proper selection of materials, eliminate the need for the formation of a laminate.

Another advantage made possible by the method of the present invention is its adaptability to the construction of very large high reflectance screens for use in drive-in theaters and the like. The construction of large screens can be accomplished by building the screen up from a multiplicity of small screen units. Large screens can also be constructed using joined segments of aluminum foil or other material exhibiting the requisite reflective surface. Forms for such construction could conveniently be assembled at the site.

Many variations, in materials and in the method have been suggested. The description herein in many particulars is suggestive of modifications which may be appropriate for different applications. For example it may be desirable with certain resins to first prime the metal surface for improved adhesion, since it is desirable for there to be a good bond between the metal or other reflective surface and the agents which render it self-supporting. Certain acrylic based paints and primers are useful for this purpose when epoxy or polyester resins are used. The use of other materials may suggest other treatments to one skilled in the art. It is also within the skill of a worker familiar with plastic reinforcing or filler materials to know that certain combinations of reinforcing materials and filler materials or mixtures thereof will produce the desired results described herein when used with the same or different polymeric resins and adhesives or blends thereof.

It is also contemplated that screens may be prepared on forms whose edges do not intersect the surface of a sphere. These also may form part of a larger screen or be used singly for given applications. Likewise the frames employed may be round, square, rectangular, cylindrical or irregular in shape for the formation of either spherical or nonspherical products.

The invention has been described in detail with particular reference to preferred embodiments thereof, but it will be understood that variations and modifications can be effected within the spirit and scope of the invention.

I claim:

1. A method of forming a self-supporting concave reflectance screen using an air-tight form and a flexible substantially air impervious planar material having two opposed surfaces at least one of which has desired screen reflectance character-istics, said method comprising temporarily sealing the edges of the flexible material to the edges of the form with said one surface facing the form to provide a substantially air-tight cavity between the form and the flexible material, introducing sufficient fluid between the form and the flexible material to support said flexible material in a shape which is concave toward the form, fixing the shape so supported by applying hardenable liquid resins on the other surface of the flexible material, hardening the resins in situ to preserve the surface characteristics of the flexible material, applying resin reinforcing materials to the hardened resins to render the flexible material rigid and self-supporting, and removing the self-supporting material along sealed edges from the form.

2. The method of claim 1 wherein the step of temporarily sealing the edges of the flexible material to the edges of the form comprises clamping the edges of the flexible material to the edges of the form to provide a substantially air-tight seal.

3. The method of claim 1 wherein the resins are selected from the group consisting of epoxy and polyester type resins and the reinforcing materials comprise woven or matte glass fibers.

4. The method of claim 1 wherein said rigid shape approximates a segment from the surface of a sphere.

5. A method of forming a self-supporting concave reflectance screen using an air-tight form and a flexible substantially air impervious metal foil stretchable to less than about 2 percent elongation and having two opposed surfaces at least one of which has desired screen reflectance characteristics, said method comprising temporarily sealing the edges of the foil to the edges of the form with said one surface facing the form to provide a substantially air tight cavity between the form and the foil, introducing sufficient fluid between the form and the foil to stretch said foil to less than about 2 percent elongation in its center and into a shape which is concave toward the form and to support the foil in such shape, fixing the shape so supported by applying hardenable liquid resins on the other surface of the foil, hardening the resins in situ to preserve the reflectance characteristics of the foil, applying resin reinforcing material to the hardened resins to render the foil rigid and self-supporting, and removing the self-supporting foil along sealed edges from the form.

* * * * *